United States Patent [19]

Smith

[11] Patent Number: 4,493,250
[45] Date of Patent: Jan. 15, 1985

[54] PORTABLE CHEESE PRESS FRAME ASSEMBLY

[75] Inventor: Gary R. Smith, Watertown, Wis.

[73] Assignee: Kusel Equipment Company, Watertown, Wis.

[21] Appl. No.: 171,124

[22] Filed: Jul. 22, 1980

[51] Int. Cl.³ .................. A01J 25/10; A01J 25/15
[52] U.S. Cl. ............................. 99/456; 99/460; 100/116; 100/237
[58] Field of Search .............. 99/456, 458–461, 99/465, 532–535; 100/110, 125, 126, 237

[56] References Cited

U.S. PATENT DOCUMENTS 2,674,179  4/1954  Harrington ..................... 99/533
4,111,110  9/1978  Smith ............................. 99/456

Primary Examiner—Timothy F. Simone
Attorney, Agent, or Firm—James E. Nilles

[57] ABSTRACT

A portable assembly for supporting cheese hoops in an inclined position from the vertical and including means for pressing the hoops so as to press the whey therefrom and permit it to drain downwardly from one hoop to the other to be collected therebelow. The frame includes support members for removably but firmly holding the hoops as they are being pressed by cylinder and piston units located at the top of the assembly. Control means are provided for actuating the units in extending or contracting directions. The gases actuating the cylinder and piston units are discharged to the floor of the apparatus, preventing their contaminating the hoops or curds that would be possible by release above those hoops.

1 Claim, 4 Drawing Figures

PORTABLE CHEESE PRESS FRAME ASSEMBLY

BACKGROUND OF THE INVENTION

1. Field of Use

This invention relates to an apparatus with a frame for pressing curd in cheese hoops to cause draining of the whey therefrom. In particular, it relates to an apparatus that presses the cheese hoops by gas-operated cylinder and piston units mounted on the frame with means for preventing contamination of the hoops by the gas and impurities contained therein upon its release from the cylinder and piston units.

2. Description of the Prior Art

Assemblies for pressing curd in cheese hoops to cause draining of the whey therefrom are known in the art, and typically described in U.S. Pat. No. 4,111,110, issued to Smith on Sept. 5, 1978, and which patent is assigned to an assignee common with the present invention. These assemblies typically press the hoops with gas-operated, double acting cylinder and piston units, the gas often being air. The unclean air and impurities contained therein are released from the units into the ambient air surrounding the apparatus adajcent the cylinders and above the cheese hoops, and the air and impurities may thus come in contact with the cheese hoops, thereby contaminating or impairing the visual purity of the hoops, resulting in a loss of product or at least the creation of a product of a lower grade and of less value in the marketplace.

SUMMARY OF THE INVENTION

The present invention provides a portable cheese press assembly for removably supporting cheese hoops that are filled with curd and having means for pressing the hoops so that the whey can drain downwardly and be collected at the bottom of the assembly. The assembly includes a frame and inclined support members for the hoops, which members securely hold the hoops and prevent them from kicking out as the pressing occurs. One form is such that the assembly has one side wherein the support members can hold a row of stacks of hoops. Extendible and contractable gas-operated cylinder and piston units are mounted on the top of the assembly and have control means for causing their actuation so that the units can press the hoops for the required amount of time and with the required degree of pressure.

The assembly is such that the hoops can be held firmly while the pressing occurs. After the pressing opertion, the hoops can be easily removed. During the pressing operation the whey is collected in a sanitary and efficient manner.

The assembly includes conduit means for discharging exhaust gases from the cylinder and piston units into the upper end of a generally vertical tubular frame member, which also has a lower end opening below the hoops and at the lower end of the frame. In this manner, the exhaust gases and impurities contained therein will not contaminate the hoops or product therein by contact with them.

These and other objects and advantages of the present invention will appear hereinafter as this disclosure progresses, reference being had to the accompanying drawings.

DESCRIPTION OF A PREFERRED EMBODIMENT

The assembly herein may include a frame with a single side or a frame including opposite sides. The construction of an assembly having a frame with a single side may be easily deduced from a description of an assembly having a frame including opposite sides, so the latter will be described herein.

Figure 1:
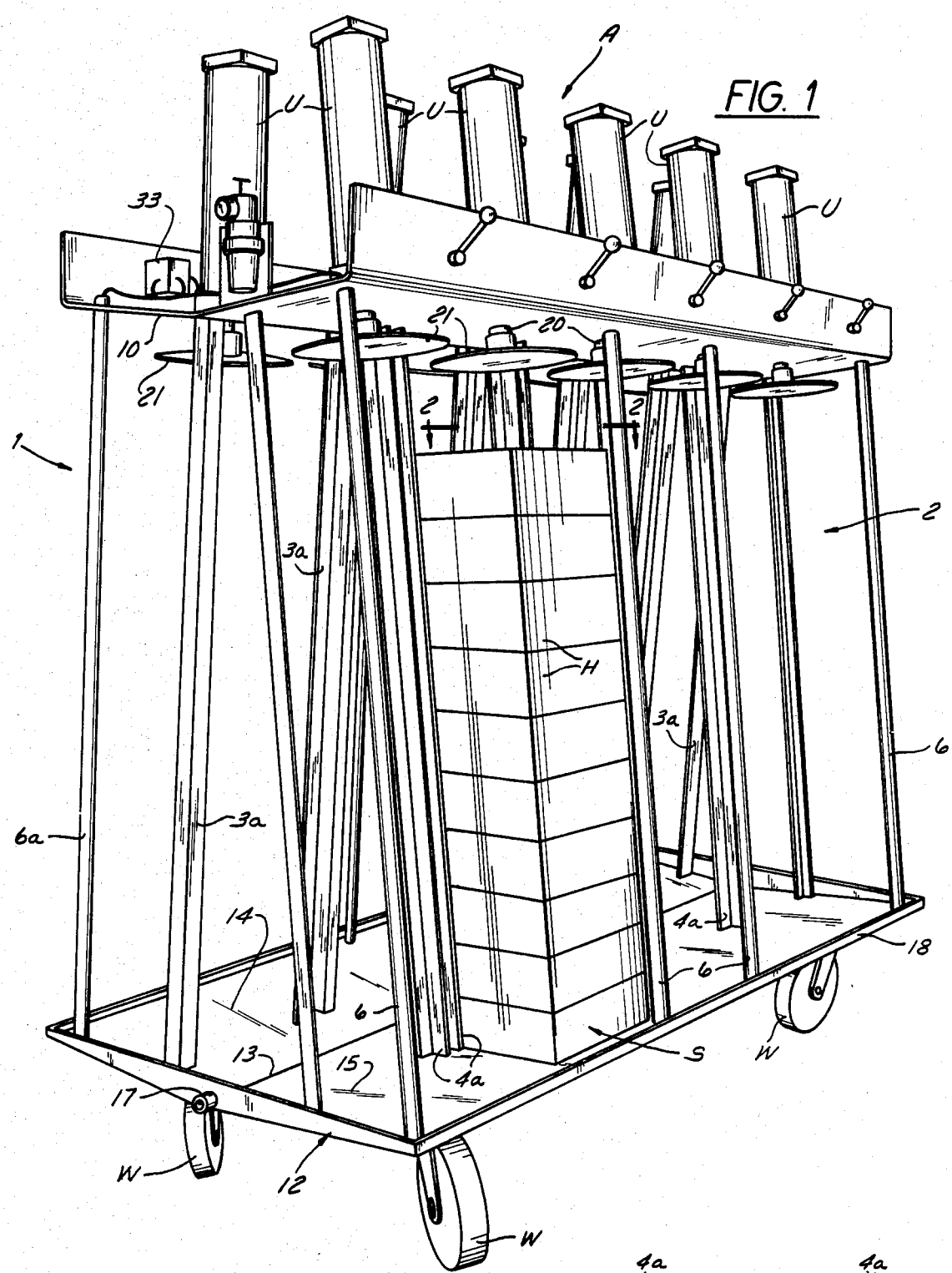
FIG. 1 is a perspective view of a portable cheese press assembly made in accordance with the present invention.
Figure 2:
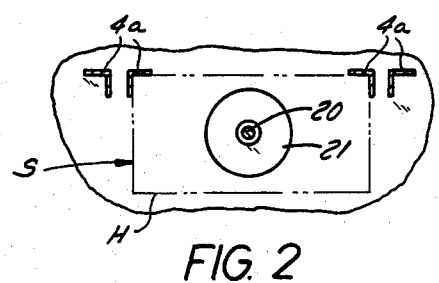
FIG. 2 is a cross-sectional view taken along line 2—2 in FIG. 1.
Figure 3:
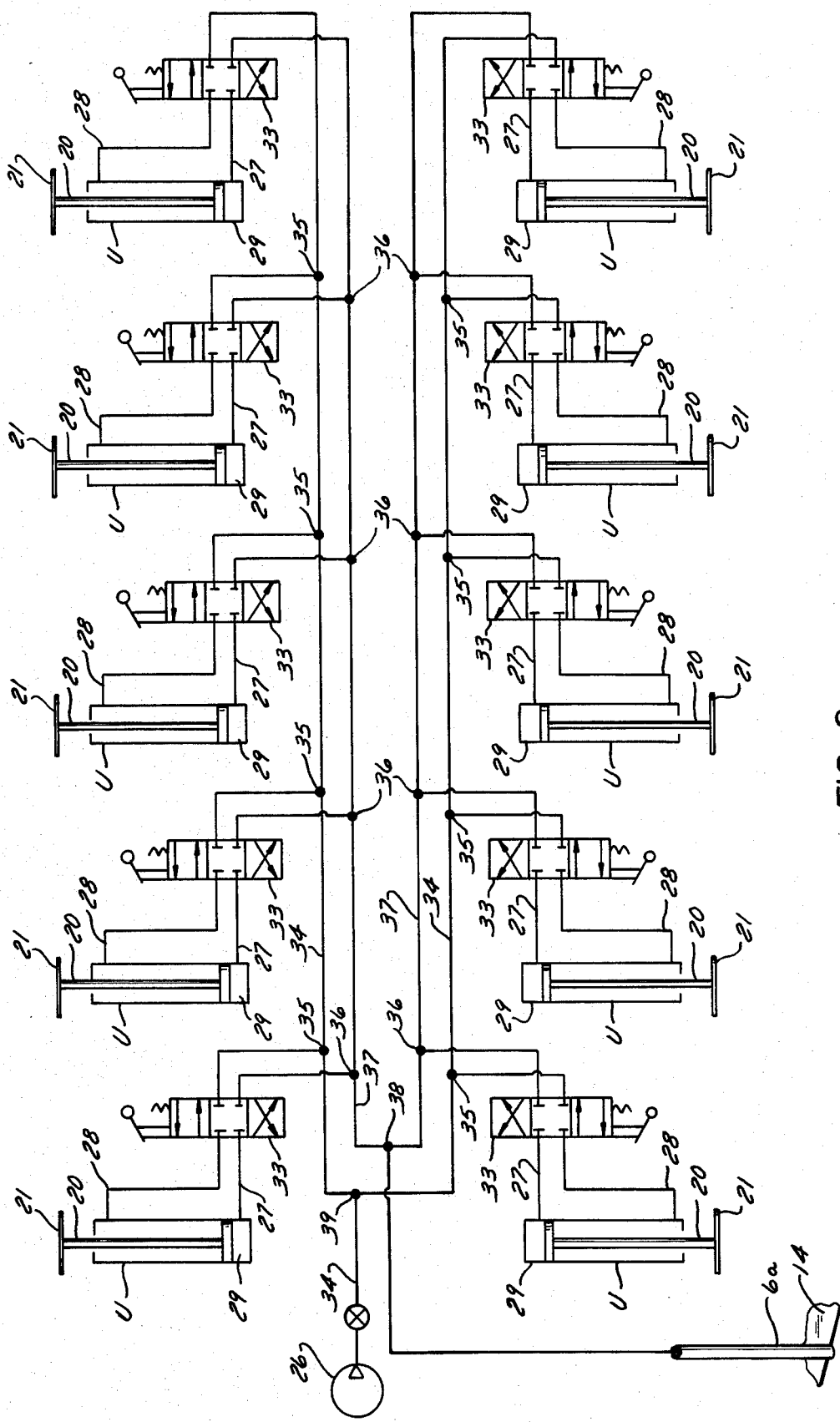
FIG. 3 is a schematic pneumatic circuit of the control system for the cylinder and piston units.

The assembly A as clearly shown in FIG. 1 includes opposite sides 1 and 2 which include hoop supporting members 3a and 4a that are arranged at an incline from the vertical and in upwardly and converging relationship with one another, so as to form a generally A shape of the assembly when viewed in end elevation. Tubular braces 6 are provided at each of the corners of the assembly and at points intermediate the frame's length. The steel angle iron members 3a, 4a, and member 6 are rigidly attached together at their upper end by the top wall 10 which is fabricated from sheet steel. The members 3a, 4a, and 6, for example, can be welded to the top wall 10 so as to form a rigid structure therewith. The assembly also includes a floor 12 which is bent along its center length as at 13 so as to form a generally V-shaped pan-like floor having inwardly and downwardly converging bottom portions 14 and 15 that act to convey whey to the center of the floor and out of the discharge drain 17 at one end. A small, upwardly turned flange 18 extends around the pan-like floor to prevent loss of liquid whey. Members 3a, 4a and 6 are preferably welded to the floor 12 so as to form a joint-free, sanitary and rigid connection between the parts.

Suitable floor engaging wheels W are provided adjacent each corner of the assembly so as to render the assembly mobile.

Means are provided for pressing downwardly on the stacks S of individual hoops H so as to force the whey to drain downwardly from one hoop to the other where it is eventually collected on the floor 12 and conveyed out of the drain 17. This pressing means includes a cylinder and piston unit U, one located above each of the stacks S of hoops and including a piston rod 20 having a pressing element 21 attached to its bottom and for contact with the top of the stack of hoops.

Figure 4:
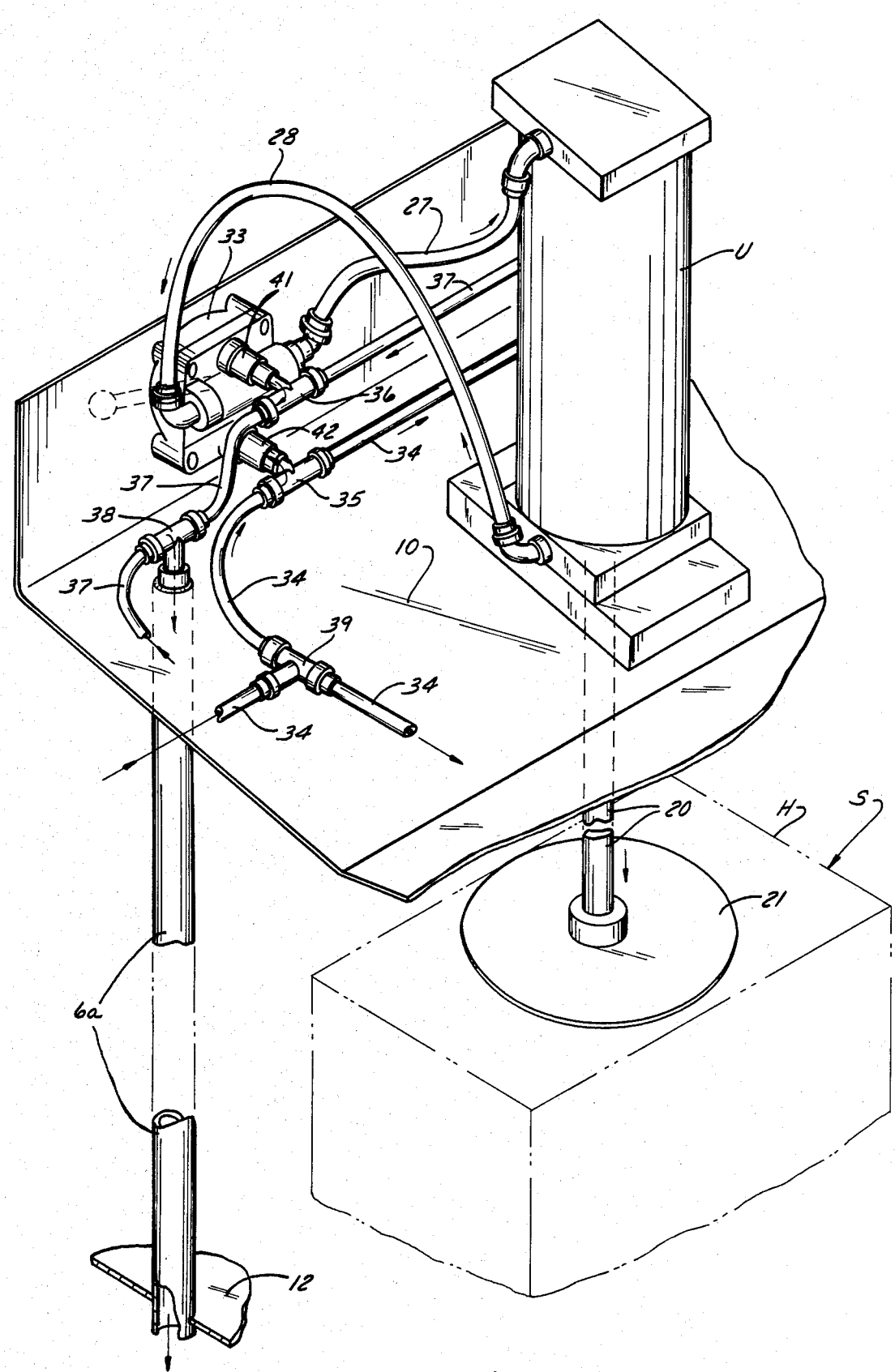
FIG. 4 is a perspective view of a portion of the pneumatic system shown in FIG. 1.

The units are gas- and preferably air-actuated, and the air is admitted from the source and leaves the cylinders through each of the three-position, four-way selector valves 33 and either conduits 27 or 28, the conduit used for air entry depending upon the desired position of the piston in each cylinder and piston unit U (FIG. 4). Air inlet line 34 is comprised of two branches connected in series to the two rows of valves 33, and to each valve at valve air inlet tee 35, providing air to each of the cylinder and piston units U, the inlet air from the air supply 26 passing into each of the branches 34 through tray air inlet tee 39. Valve exhaust line 37 is also comprised of two branches connected in series to the two rows of valves 33 and to each valve at valve air exhaust port 41 permitting air exhausted from the cylinder and piston units U to pass therethrough and to tray exhaust tee 38. The valve's three positions are neutral, which prevents air from entering or leaving cylinder and piston units U; down, which permits air to enter the head end 29 of the cylinder through upper conduit 27 so as to cause extension of the piston in the known manner, and which further permits air to leave the rod end of the cylinder through lower conduit 28; and up, which permits air to enter the rod end of the cylinder through lower conduit 28 so as to cause retraction of the piston in the known manner, and which further permits air to leave the head end 29 of the cylinder through upper conduit 27.

Thus, with the valve 33 in the down position, as shown in FIG. 4, air from supply 26 enters the valve 33 through the left branch of air inlet line 34 and valve air inlet tee 35, and into the head end 29 of cylinder and piston unit U through upper conduit 27, causing downward movement of the piston to engage the stacks S of individual hoops H therebelow. Upon positioning of the valve 33 in the down position, air in the rod end of the cylinder and piston unit U is exhausted to tray exhaust tee 38 through lower conduit 28 connected to valve 33, and through valve air exhaust tee 36 and the left branch of valve exhaust line 37.

With the valve in the up position, as shown in FIG. 1, air from supply 26 enters valve 33 through the right branch of air inlet line 34 and valve air inlet tee 35, and into the rod end of cylinder and piston unit U through lower conduit 28, causing upward movement of the piston to be retracted into the cylinder and disengage the stacks S of individual hoops H therebelow. Upon positioning of the valve 33 in the up position, air in the head end of cylinder and piston unit U is exhausted to tray exhaust tee 38 through upper conduit 27 connected to valve 33, and through valve air exhaust tee 36 and the right branch of valve exhaust line 37.

Tray exhaust tee 38 is weldably or otherwise engaged to vertical tubular frame member 6a, which extends through an aperture in top wall 10 and opens for discharge at floor 12. Unclean air and moisture from the cylinder and piston units U entering exhaust tee 38 is discharged through the floor 12 through vertical tubular frame member 6a, thereby preventing contamination of hoops H that could occur if the air and moisture was discharged at the cylinder and piston unit U into the ambient air over the top wall 10. Such contamination may occur if the unclean air and moisture, released above the stacks S of hoops H, is blown towards the stacks S by air currents inside the building in which the hoops H are being processed after that air and moisture falls below the top wall 10. In contrast, with the present invention, the air and moisture passing through vertical tubular member 6a is discharged at the lower end thereof below floor 12 and will not contact and contaminate the stack S.

RECAPITULATION

The apparatus described herein provides for the pressing of curd in cheese hoops to cause draining of the whey therefrom. The gas used to actuate cylinder and piston units which press the hoops and the moisture and other impurities contained in that gas are discharged to the building floor, below the lowermost hoop on the apparatus. In this way, the unclean gas and its moisture and other impurities contained therein cannot move from the ambient air above the hoops, where they are normally released, to the hoops. Thus, the release of cylinder-actuating gases below the apparatus' floor prevents contamination of the hoops or the product by those gases and their impurities.

I claim:

1. A portable cheese press frame assembly for being supported on a floor and for removably supporting hoops and for pressing the curd in said hoops to cause draining of the whey therefrom, said assembly comprising a frame including a generally vertical tubular frame member having an upper end and also having a lower end which opens below said hoops and at the lower end of said frame and adjacent said floor, a fluid circuit mounted on the upper end of said frame assembly, said assembly also including gas-operated cylinder and piston units mounted on the top of said frame and including an extensible piston member extending downwardly for pressing the curds in said hoop, control means carried by said assembly for actuating said cylinder and piston units in extending and contracting directions, said cylinder and piston units and said control means being located in said fluid circuit, a valve exhaust line in said circuit for receiving exhaust fluid from said control means, conduit means for discharging exhaust gases from said cylinder and piston units through said control means and through said valve exhaust line and into said upper end of said tubular frame member for discharge from the lower end thereof so as to ensure that said exhaust gases and impurities contained therein will not contaminate said hoops by contact therewith.

* * * * *